United States Patent [19]

Higuchi et al.

[11] 4,084,981
[45] Apr. 18, 1978

[54] QUICK HARDENING CEMENT-ASPHALT COMPOSITION

[75] Inventors: Yoshiro Higuchi, Higashikurume; Yutaka Harada, Murashino; Toshio Sato, Tokyo; Koji Nakagawa, Asahi; Iwazo Kawaguchi, Tokyo; Yasushi Kasahara, Sagamihara, all of Japan

[73] Assignees: Japanese National Railways; Denki Kagaku Kogyo Kabushiki Kaisha; Toa Doro Kogyo Co., Ltd., all of Tokyo, Japan

[21] Appl. No.: 512,393

[22] Filed: Oct. 4, 1974

[30] Foreign Application Priority Data

Oct. 4, 1973 Japan .................. 48-110958

[51] Int. Cl.$^2$ ............................. C04B 7/356
[52] U.S. Cl. ..................... 106/96; 106/104; 106/116
[58] Field of Search .................. 106/96, 104, 116

[56] References Cited

U.S. PATENT DOCUMENTS

| Re. 20,119 | 9/1936 | Sommer | 106/96 X |
|---|---|---|---|
| 2,514,021 | 7/1950 | Abraham | 106/96 |
| 3,856,540 | 12/1974 | Mizunuma et al. | 106/89 |
| 3,867,161 | 2/1975 | Torii et al. | 106/96 |

OTHER PUBLICATIONS

Kirk Othmer Encyclopedia of Chemical Technology 2nd ed., vol. 8, pp. 127-131.
The Chemistry of Cement and Concrete, F. M. Lea, 1956, pp. 252-253, 1956, Edward Arnold (Pub.) Ltd., London.
Concrete Technology and Practice, W. H. Taylor, 1965, pp. 184-187, American Elsevier Publ. Co. Inc., New York.

Primary Examiner—Winston A. Douglas
Assistant Examiner—John P. Sheehan
Attorney, Agent, or Firm—Sughrue, Rothwell, Mion, Zinn and Macpeak

[57] ABSTRACT

A quick hardening cement-asphalt composition used as a grout for a ballast-filled track structure comprising
(a) 100 parts by weight of a cement composition prepared by adding to portland cement about 10 to 50% by weight of a mixture of a calcium aluminate-series mineral and calcium sulfate in a weight ratio of about 1:0.3 to 1:3; about 0.05 to 10% by weight of an inorganic salt, and about 0.05 to 3% by weight of at least one of an organic carboxylic acid, an organic hydroxycarboxylic acid and a salt thereof, and
(b) about 30 to 400 parts by weight of an asphalt emulsion containing about 0.2 to 8% by weight of a polyoxyethylene alkyl phenyl ether, polyoxyethylene alkyl ether, polyoxyethylene alkyl ester, sorbitan alkyl ester, polyoxyethylene sorbitan alkyl ester or sucrose fatty acid ester nonionic emulsifier and about 0.05 to 2% by weight of a multivalent metal chloride, calculated as the multivalent metal ion.

15 Claims, No Drawings

QUICK HARDENING CEMENT-ASPHALT COMPOSITION

BACKGROUND OF THE INVENTION

1. Field of the Invention

The present invention relates to a quick hardening cement-asphalt composition used for making a grout for a ballast-filled track structure.

2. Description of the Prior Art

A conventional ballast-filled track structure requires great labor or effort for safely maintaining the track structure after construction, such as, for example, tamping, the correction of the distortion of the track, and the renewal of the ballast and thus the development of a maintenence-free track structure has been keenly desired.

As countermeasures, a slab-type track structure, that is, a track structure wherein the spaces between the track slab and the base layer is filled with an elastic material and a ballast-filled track structure, that is, a track structure wherein the spaces between the ballast for a conventional ballast track structure are filled with an elastic material are known. The slab-type track structure has already been utilized in various applications such as new high speed railways such as the Shinkansen (Tokaido-Line), Japan and conventional railways, while for the ballast-filled track structure, a mixture of cement and asphalt has been employed as the elastic material.

However, since a ballast-filled track structure is applied to tracks on which trains have actually run, it is difficult to construct a ballast-filled track structure within a sufficient period of time. Therefore, the elastic material must be poured in the spaces between the ballast in a short period of time. Thus, the use of a cement-asphalt grout composed of a simple mixture of portland cement and asphalt is accompanied by the disadvantage that the grout does not exhibit the desired strength before the passage of a train after applying the grout to the ballast and hence the track is forced out of alignment considerably.

Therefore, attempts have been made to employ a cement-asphalt grout in which a commercially available quick hardening cemment is used as disclosed in U.S. Pat. No. 3,628,973 but such a cement-asphalt grout does not provide sufficient strength in a short period of time and this type of grout is unsatisfactory.

That is, the grout used for a ballast-filled track structure must have the following properties:

(1) the grout must exhibit a compressive strength above about 4 Kg/cm$^2$ within about 60 to 90 minutes after execution, (2) the consistency of the grout must be about 5 to 10 seconds with a J funnel (the PC grout test method by the Civil Engineering Society of Japan), (3) the grout must maintain its consistency of item (2) above for at least 20 minutes after mixing, and (4) the grout must exhibit the compressive strength of item (1) above at temperatures ranging from about 5° to 35° C.

SUMMARY OF THE INVENTION

An object of this invention is, therefore, to provide a cement-asphalt grout having the aforesaid properties.

Another object of this invention is to provide an improved cement-asphalt composition which can be used as a grout for a ballast-filled track structure.

That is, according to the present invention, there is provided a quick hardening cement-asphalt composition which can be used as a grout for a ballast-filled track structure comprising (a) 100 parts by weight of a cement composition prepared by adding to a portland cement about 10 to 50% by weight of a mixture of a calcium aluminate-series mineral and calcium sulfate in a weight ratio of about 1:0.3 to 1:3, about 0.05 to 10% by weight of an inorganic salt, and about 0.05 to 3% by weight of at least one organic carboxylic acid, organic hydroxycarboxylic acid or a salt thereof and (b) about 30 to 400 parts by weight of an asphalt emulsion containing about 0.2 to 8% by weight of at least one nonionic emulsifier selected from a polyoxyethylene alkyl phenyl ether, polyoxyethylene alkyl ether, plyoxyethylene alkyl ester, sorbitan alkyl ester, polyoxyethylene sorbitan alkyl ester or sucrose fatty acid ester nonionic emulsifier and about 0.05 to 2% by weight of a multivalent metal chloride calculated as the multivalent metal ion.

DETAILED DESCRIPTION OF THE INVENTION

Examples of calcium aluminate series minerals which can be used in the present invention include 3CaO·Al$_2$O$_3$, 12CaO·7Al$_2$O$_3$, CaO·Al$_2$O$_3$, CaO·2Al$_2$O$_3$ and 3CaO·3Al$_2$O$_3$·CaF$_2$ in either a crystal, amorphous or partially amorphous form. In addition, 11CaO·7Al$_2$O$_3$·CaF$_2$ in an amorphous form can effectively be used as hereinafter described (Example 3, Run No. 28), but the crystal form of this mineral is not effective (Example 1, Run No. 21). The most preferred calcium aluminate series mineral is an amorphous mineral composed of CaO and Al$_2$O$_3$ in a molar ratio of 12 : 7, i.e., 12CaO·7Al$_2$O$_3$· because it has the highest quick hardening property and thus is most preferred.

These calcium aluminate-series minerals as enumerated above can be produced by blending a lime material such as limestone, quick lime, slaked lime and the like, an alumina material, such as white bauxite, red bauxite, diaspore, alumina and the like and a fluoride such as fluorite, calcium fluoride and the like in an amount stoichiometrically determined according to the desired mineral, and sintering or melting the resulting blend at a temperature above about 1200° C using a rotary kiln, a direct electric resistance furnace or a like furnace followed by cooling. Those minerals obtained by sintering followed by quenching or annealing or those minerals obtained by melting followed by annealing are crystalline, but the proportion of non-crystalline material can optionally be varied by varying the rate of cooling after the above melting. Generally, when the blend in a molten state is cooled by blowing a pressurized gas, e.g., at 5kg/cm$^2$, most of the blend becomes non-crystalline. The resulting crystalline or non-crystalline mineral is then pulverized into particles having a specific surface area of above about 3000 cm$^2$/g, preferably 5000 to 8000 cm$^2$/g (Blaine value), which are then blended with calcium sulfate particles having approximately the same specific surface area as that of the mineral particles. The blend of particles thus obtained is incorporated into porland cement together with a setting controlling agent. The apparatus which can be used for the above pulverization and blending can be any type of apparatus generally employed in the art, for example, a ball mill, a vibration mill, a V-shape blender and the like.

Even if the calcium aluminate-series mineral is added along to portland cement, the objects of this invention can not be attained and for the objects of the invention calcium sulfate must be further added. The ratio of the calcium aluminate-series mineral and the calcium sulfate to be added to portland cement is about 0.3 to 3 parts by weight of calcium sulfate, preferably 0.8 to 1.2, to 1 part by weight of the calcium aluminate series mineral and if they are added in a ratio other than the above, the desired quick hardening property and strength are not obtained.

Calcium sulfate which can be used in the present invention can include dihydrates, semihydrates and anhydrides thereof, with anhydrous calcium sulfate being preferred.

The mixture of the calcium aluminate-series mineral and calcium sulfate is added to portland cement in an amount of about 10 to 50% by weight, preferably 20 to 35% by weight. If the amount of the mixture added is less than about 10% by weight, the quick hardening property and the strength are unsatisfactory, while if the amount of the mixture added is greater than about 50% by weight, the cost of the product increases and hence the use of such a large amount of the mixture is economically undesirable.

Examples of portland cement which can be used in the present invention include portland cements of Type I to Type V specified in ASTM, and a normal portland cement, a moderate heat portland cement, rapid-hardening portland cement, super rapid-hardening portland cement specified in JIS R5210, as well as the above portland cement having incorporated therein silica and fly ask. Reference can be made to the above ASTM and JIS R5210 with respect to detailed characteristics of these portland cements. Compositions of typical portland cements are shown below.

bonates such as $Na_2SO_4$, $K_2SO_4$, $NaNO_3$, $NaNO_2$, $KNO_3$, $KNO_2$, $Ca(NO_2)_2$, $Ca(NO_3)_2$, $MgSO_4$, $FeSO_4$, $Al_2(SO_4)_3$, $CaB_4O_7$, $Na_2B_4O_7$, $Na_2CO_3$, $NaHCO_3$ and $KHCO_3$. These salts can be used individually or in combination, and of the above described salts the carbonates are most preferred, in particular $Na_2CO_3$ and $K_2CO_3$. These inorganic salts are used in a proportion of from about 0.05 to about 10%, preferably 0.5 to 3% by weight based on the weight of the portland cement.

The organic acid or a salt thereof which can be used in present invention is at least one member selected from organic carboxylic acids, organic hydroxycarboxylic acids and the salts thereof. Examples of organic carboxylic acids, organic hydroxycarboxylic acids and the salts thereof are carboxylic acids such as malonic acid, succinic acid, glutaric acid, 1,2,3-propanetricarboxylic acid, nitrilotriacetic acid, EDTA (ethylenediamine tetraacetic acid) and the like, hydroxycarboxylic acids such as malic acid, gluconic acid, citric acid, tartaric acid, salicylic acid, oxymalonic acid, lactic acid and the like, and alkali metal or alkaline earth metal salts thereof such as sodium, potassium, calcium, magnesium and the like. Hydroxycarboxylic acids and salts thereof are preferred. Typical examples of the acids or the salts thereof which are particularly suitable for the present invention are citric acid, sodium citrate, potassium citrate, calcium citrate, tartaric acid, sodium tartarate, potassium tartarate and calcium tartarate. These organic acids and the salts thereof are used in a proportion of from about 0.05 to about 3%, preferably from 0.1 to 1% by weight based on the weight of the portland cement.

By mixing 100 parts of the cement composition as prepared above and about 30 to 400 parts by weight of the asphalt emulsion, described in greater detail hereinafter, the composition of this invention as a grout for a ballast-filled track structure is obtained.

If the amount of the asphalt emulsion is below about 30 parts of weight, the composition does not have proper elasticity and if the amount of the asphalt emulsion is greater than about 400 parts by weight, the setting of the composition is delayed and the grout has a low mechanical strength. Better results are obtained by mixing 70 to 200 parts by weight of the asphalt emulsion with 100 parts by weight of the cement composition.

The asphalt emulsion used in this invention is a nonionic emulsion and a characteristic thereof is that the

| Cement | Chemical Composition (%) | | | | | | | | Mineral Composition (%) | | | | Specific Gravity | Specific surface Area $cm^2/g$[6] |
|---|---|---|---|---|---|---|---|---|---|---|---|---|---|---|
| | Ignition Loss | Insoluble Material | $SiO_2$ | $Al_2O_3$ | $Fe_2O_3$ | CaO | MgO | $SO_3$ | Total | $C_3S$[1] | $C_2S$[2] | $C_3A$[3] | $C_4AF$[4] | | |
| Normal Portland | 0.6 | 0.1 | 22.2 | 5.1 | 3.2 | 65.1 | 1.4 | 1.6 | 99.3 | 53 | 24 | 8 | 10 | 3.17 | 3220 |
| Rapid Hardening Portland | 0.9 | 0.2 | 21.0 | 4.9 | 2.8 | 66.2 | 1.1 | 2.5 | 99.6 | 66 | 11 | 8 | 9 | 3.13 | 4340 |
| Super Rapid Hardening Portland | 0.9 | 0.1 | 19.7 | 5.1 | 2.7 | 64.7 | 2.0 | 3.0 | 98.2 | 68 | 5 | 9 $C_{11}A_7$[5] | 8 | 3.14 | 5950 |
| Jet Cement | 0.6 | 0.1 | 13.8 | 11.4 | 1.5 | 59.1 | 0.9 | 10.2 | 97.6 | 52 | 0 | $CaF_2$ 22 | 5 | 3.04 | 5300 |

[1]$C_3S$: $3CaO \cdot SiO_2$
[2]$C_2S$: $2CaO \cdot SiO_2$
[3]$C_3A$: $3CaO \cdot Al_2O_3$
[4]$C_4AF$: $4CaO \cdot Al_2O_3 \cdot Fe_2O_3$
[5]$C_{11}A_7$: $11CaO \cdot 7Al_2O_3$
[6]Blaine value Furthermore, in the present invention, an inorganic salt and an organic carboxylic acid or a salt thereof are added to the composition for controlling the workability. The amount of these salts added to the portland cement are about 0.05 to 10% by weight of the inorganic salt and about 0.05 to 3% by weight of the organic acid or a salt thereof. If these salts are added in an amount outside these ranges, the workability (setting property) of the composition cannot be controlled.

Example of suitable inorganic salts which can be used in this invention are inorganic halides such as $ZnCl_2$, $AlCl_3$, $CaCl_2$, $MgCl_2$, $FeCl_2$, $FeCl_3$, $NiCl_2$, $CoCl_2$, and $MgBr_2$, and sulfates, nitrates, nitrites, borates, and caremulsion contains at least one of a polyoxyethylene alkylphenyl ether, a polyoxyethylene alkyl ether, a polyoxyethylene alkyl ester, sorbitan alkyl ester, a polyoxyethylene sorbitan alkyl ester and a sucrose fatty acid ester surface active agent, as a nonionic emulsifier and a multivalent metal chloride.

Of these surface active agents, preferred surface active agents are a polyoxyethylene alkyl phenyl ether having the formula (I)

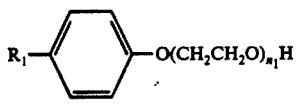

wherein $R_1$ represents a straight chain or branched chain alkyl group having about 6 to 18 carbon atoms, most preferably 8 to 12 carbon atoms, and $n_1$ is 10 to 80, most preferably 20 to 40; a polyoxyethylene alkyl ether having the formula (II)

wherein $R_2$ represents a straight chain or branched chain alkyl group having 8 to 22 carbon atoms, most preferably 12 to 18 carbon atoms, and $n_2$ is 8 to 80, most preferably 10 to 30; a polyoxyethylene alkyl ester having the formula (III)

wherein $R_2$ represents a straight chain or branched chain alkyl group having 8 to 22 carbon atoms and $n_3$ is 10 to 100; a sorbitan alkyl ester having the formula (IV)

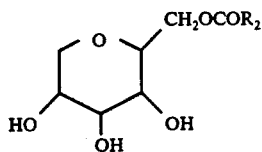

wherein $R_2$ is a straight chain or branched chain alkyl group having 8 to 22 carbon atoms; and a polyoxyethylene sorbitan alkyl ester having the formula (V)

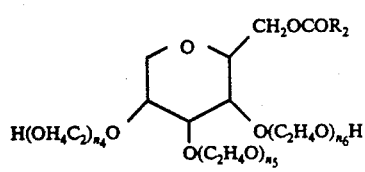

wherein $R_2$ represents a straight chain or branched chain alkyl group having 8 to 22 carbon atoms and $n_4$, $n_5$ and $n_6$ are 10 to 80.

Particularly preferred surface active agents are those represented by the formula (I) above.

The nonionic surface active agent is added to the asphalt emulsion in an amount of about 0.2 to 8% by weight, preferably 0.5 to 3% by weight.

Examples of preferred multivalent metal chlorides are $AlCl_3$, $FeCl_2$, $FeCl_3$, $CaCl_2$, $ZnCl_2$, $SnCl_2$, $SnCl_4$, $BaCl_2$ and $MgCl_2$ and the multivalent metal is incorporated in the asphalt emulsion in an amount of about 0.05 to 2% by weight, preferably 0.1 to 1% by weight, calculated as the multivalent metal ion. A particularly preferred multivalent metal chloride is $CaCl_2$.

It is also desireable to use an asphalt having a penetration of about 40 to 60 to about 200 to 300 and further it is preferred that the asphalt emulsion contain 50 to 65% by weight asphalt.

By using such a nonionic asphalt emulsion, the miscibility thereof with the cement composition and the workability of the composition can be improved without reducing the hydration reaction of the cement. Also, due to the presence of the multivalent metal ions, the hydration speed of the cement-asphalt composition can be increased and further the initial strength of the composition can be also increased.

As described above, the composition of this invention which can be used as a grout for a ballast-filled track structure comprises a cement composition having a specific composition and an asphalt emulsion. The composition of this invention is very stable to changes in temperature on use, provides a compressive strength of higher than about 4 kg/cm² within 1.5 hours after use even at a low temperature, gives, as a matter of course, the desired strength at high temperature, and has good workability. Moreover, the working period of time can be controlled desirably by changing appropriately the proportion of the inorganic salt and the organic acid or organic acid salt.

The invention is explained in greater detail by reference to the following examples. Unless otherwise indicated, all parts, percents, ratios and the like are by weight.

EXAMPLE 1

Preparation of the cement composition:

A mixture of 46.2 parts by weight of calcium oxide having a purity of 94.0% and 53.8 parts by weight of white bauxite having a purity of 86.7% was melted completely in a direct-type electric furnace. The temperature of the melted mixture was about 1500° C. measured with an optical pyrometer. While the molten product flowed from the furnace, the product was quenched by applying compressed air at a pressure of 5 Kg/cm² to the product.

The cooled product was confirmed to be an amorphous composition having a ratio of 12 moles of CaO to 7 moles $Al_2O_3$, ($12CaO.7Al_2O_3$).

The product was pulverized to a specific area of about 5500 cm²/g (Blaine value) and 100 parts of the powder thus prepared was mixed with 100 parts of anhydrous calcium sulfate having a Blaine value of about 6000 cm²/g.

Then, 33.3% by weight of the mixture prepared above and 2–3% by weight of a mixture of citric acid and $K_2CO_3$ in a weight ratio of 1:3 as a setting controlling agent were mixed with normal portland cement (made by Onoda Cement Co.) to produce the cement composition.

Preparation of the asphalt emulsion:

The following components were uniformly emulsified to provide an asphalt emulsion.

| | Parts by weight |
|---|---|
| Straight Asphalt (penetration 80/100) | 60 |
| Polyoxyethylene Nonylphenyl Ether | 3 |
| $CaCl_2$ | 1 |
| Water | 40 |

Test procedure:

In a two liter vessel were charged 800 g of the cement composition containing different proportions of the setting controlling agent to the portland cement as shown in Table 1 below, 800 g of the asphalt emulsion, 800 g of sand (naturally occuring sand from Kakizaki, Niigata Prefecture, Japan), and 300 ml of water and these materials were mixed for 4 minutes at a rotation speed of 140 r.p.m. The mixture was poured into a steel mold of a size of 4 cm × 4 cm × 16 cm and the properties of the block at various ages and curing temperatures were measured.

For comparison, the same procedures were repeated under the same conditions as described above except that Jet Cement (trade name, made by Onoda Cement Co.) was used instead of the cement composition of this invention, 0.25% by weight citric acid was used as the setting controlling agent (Run No. 21), and a cationic asphalt A Emulsion (trade name, made by Nichireki Kogyo K. K.) was used instead of the asphalt emulsion of this invention. (Run No. 22)

The results obtained are shown in Table 1.

The above mixture was pulverized and calcined for 2 hours at 1350° C. in a platinum crucible and then the product was pulverized to a Blaine value of 4500 cm$^2$/g. The calcined product was confirmed to be $3CaO.3Al_2O_3.CaF_2$ by X-ray diffraction analysis.

Then, 15 parts by weight of $3CaO.3Al_2O_3.CaF_2$ thus prepared was mixed with 15 parts by weight of pulverized anhydrous calcium sulfate (Blaine value:8000 cm$^2$/g), and 70 parts by weight of normal portland cement (made by Denki Kagaku Kogyo K. K.) and the mixture was compounded with 2 parts by weight of $Na_2CO_3$ and 0.2 part by weight of sodium citrate (Run No. 23) or with 2 parts by weight of $Na_2CO_3$ and 0.3 part by weight of sodium cirtrate (Run No. 24) as a setting controlling agent to provide a cement composition. By following the same procedure as described in Example 1 using the cement compostion thus prepared and the asphalt emulsion as described in Example 1 at 20° C., a quick hardening cement-asphalt composition was prepared. The results obtained are shown in Table 2.

Table 1

| Run No. | Temperature (° C) | Setting Controlling Agent (Cement ;33 %) | Water/Cement (%) | Mixing Temperature (° C) | Flow Time Through J-Funnel (sec) with Age | | | | | | Compressive Strength (kg/cm$^2$) | | |
|---|---|---|---|---|---|---|---|---|---|---|---|---|---|
| | | | | | 0 min | 10 min | 20 min | 30 min | 40 min | 50 min | 1.0 hr. | 1.5 hrs. | 3.0 hrs. |
| 1 | 5 | 2.00 | 37.5 | 6.0 | 5.6 | 6.0 | x[1] | | | | 5.5 | 6.9 | 6.2 |
| 2 | | 2.25 | | 6.5 | 5.1 | 5.5 | 6.0 | x | | | 5.8 | 6.0 | 6.2 |
| 3 | | 2.50 | | 5.0 | 5.9 | 6.0 | 7.0 | X | | | 5.6 | 5.9 | 5.9 |
| 4 | | 2.75 | | 5.0 | 5.8 | 5.8 | 7.5 | x | | | 5.6 | 6.1 | 6.6 |
| 5 | | 3.00 | | 5.0 | 5.6 | 6.0 | 7.1 | x | | | 6.4 | 6.8 | 7.4 |
| 6 | 10 | 2.00 | 37.5 | 10.0 | 5.7 | 5.8 | 7.2 | x | | | 5.8 | 6.0 | 6.9 |
| 7 | | 2.25 | | 10.2 | 5.6 | 5.8 | 6.0 | x | | | 3.6 | 5.3 | 6.6 |
| 8 | | 2.50 | | 9.7 | 5.5 | 5.6 | 6.0 | 8.0 | x | | 2.7 | 3.9 | 5.6 |
| 9 | | 2.75 | | 9.7 | 5.6 | 5.7 | 6.0 | 8.0 | x | | 2.3 | 3.6 | 4.8 |
| 10 | | 3.00 | | 10.0 | 5.7 | 6.1 | 7.1 | 10.0 | x | | 1.6 | 3.3 | 4.5 |
| 11 | 20 | 2.00 | 37.5 | 20.7 | 5.4 | 5.4 | 6.0 | x | | | 6.0 | 6.9 | 9.4 |
| 12 | | 2.25 | | 20.2 | 5.5 | 5.5 | 6.0 | x | | | 6.1 | 6.9 | 8.8 |
| 13 | | 2.50 | | 20.1 | 5.5 | 5.7 | 5.7 | 7.1 | x | | 3.4 | 6.8 | 8.2 |
| 14 | | 2.75 | | 20.3 | 5.5 | 5.6 | 5.7 | 6.3 | 7.5 | x | 0 | 4.9 | 8.2 |
| 15 | | 3.00 | | 20.0 | 5.6 | 5.8 | 5.8 | 5.8 | 7.9 | x | 0 | 0 | 5.0 |
| 16 | 30 | 2.00 | 37.5 | 30.5 | 5.1 | 5.6 | x | | | | 6.4 | 6.8 | 8.4 |
| 17 | | 2.25 | | 29.0 | 5.3 | 5.8 | 5.7 | x | | | 6.6 | 6.9 | 9.1 |
| 18 | | 2.50 | | 29.0 | 5.4 | 5.9 | 5.9 | x | | | 4.7 | 6.6 | 7.8 |
| 19 | | 2.75 | | 28.0 | 5.1 | 5.4 | 5.9 | 6.4 | x | | 1.0 | 3.0 | 7.8 |
| 20 | | 3.00 | | 29.0 | 5.8 | 5.2 | 5.2 | 7.3 | x | | 0 | 5.0 | 7.5 |
| 21 | 20 | 0.25 | 45.0 | 20.0 | 6.5 | 7.5 | 10.2 | x | | | — | 2.5 | 4.6 |
| 22 | | 2.50 | 37.5 | 20.1 | 5.8 | 5.8 | 5.8 | 6.5 | x | | 1.0 | 3.1 | 5.0 |

Note:
[1](x): The flowing time was over 30 seconds and setting occurred.

Table 2

| Run No. | Temperature (° C) | Setting Controlling Agent (Cement × %) | Water/Cement (%) | Mixing Temperature (° C) | Flow Time Through J-Funnel (sec) with Age | | | | Compressive Strength (kg/cm$^2$) | | |
|---|---|---|---|---|---|---|---|---|---|---|---|
| | | | | | 0 min. | 10 min. | 20 min. | 30 min. | 1.0 hr. | 1.5 hrs. | 3.0 hrs. |
| 23 | 20 | 2.2 | 37.5 | 20.0 | 6.1 | 6.2 | x | | 2.1 | 5.0 | 6.1 |
| 24 | 20 | 2.3 | 37.5 | 20.0 | 5.7 | 6.1 | 9.5 | x | 2.0 | 4.1 | 6.3 |

EXAMPLE 2

Preparation of the cement composition:

As the calcium aluminate series mineral, $3CaO.3Al_2O_3.CaF_2$ was prepared under the following conditions:

| | % by weight |
|---|---|
| Calcium Carbonate (purity 99.0%) | 43.8 |
| Alumina (purity 99.5%) | 44.3 |
| Calcium Fluoride (purity 95.0%) | 11.9 |

EXAMPLE 3

By following the same procedure as described in Example 1 except that $CaO.Al_2O_3$, $3CaO.Al_2O_3$, or $11CaO.7Al_2O_3.CaF_2$ was used as the amorphous material instead of the $12CaO.7Al_2O_3$ in Example 1, a cement-asphalt composition was prepared and the composition was also tested as described in Example 1. The results obtained are shown in Table 3.

Table 3

| Run No. | Amorphous Mineral | Temperature (°C) | Setting controlling Agent (Cement × %) | Water/Cement (%) | Mixing Temperature (°C) | Flow Time Through J-Funnel (sec) with Age | | | | Compressive Strength (kg/cm²) | | |
|---|---|---|---|---|---|---|---|---|---|---|---|---|
| | | | | | | 0 min. | 10 min. | 20 min. | 30 min. | 1 hr. | 1.5 hrs. | 3 hrs. |
| 25 | CaO . Al₂O₃ | 20 | 2.00 | 37.5 | 20.1 | 5.8 | 6.2 | 6.2 | x | 3.8 | 4.3 | 6.9 |
| 26 | 3CaO . Al₂O₃ | 20 | 2.00 | 37.5 | 20.1 | 5.9 | 6.6 | 6.9 | x | 4.1 | 4.7 | 5.8 |
| 27 | CaO . 2Al₂O₃ | 20 | 2.00 | 37.5 | 20.1 | 6.1 | 6.1 | 6.9 | x | 3.2 | 4.4 | 6.2 |
| 28 | 11CaO . 7Al₂O₃ . CaF₂ | 20 | 2.00 | 37.5 | 20.4 | 5.3 | 5.9 | 7.1 | x | 4.8 | 6.2 | 8.5 |

While the invention has been described in detail and with reference to specific embodiments thereof, it will be apparent to one skilled in the art that various changes and modifications can be made therein without departing from the spirit and scope thereof.

What is claimed is:

1. A quick hardening cement-asphalt composition used as a grout for a ballast-filled track structure having the following properties:
   (1) a compressive strength of about 4 kg/cm² within about 60 to 90 minutes after execution,
   (2) a consistency of about 5 to 10 seconds with a J funnel (the PC grout test method by the Civil Engineering Society of Japan),
   (3) the consistency of (2) above must be maintained for at least 20 minutes after mixing, and
   (4) the compressive strength of (1) above must be maintained at temperatures ranging from about 5° C to 35° C, said cement-asphalt composition consisting essentially of
   (a) 100 parts by weight of a cement composition prepared by adding to portland cement about 20 to 35% by weight of a mixture of a calcium aluminate-series mineral selected from the group consisting of amorphous $3CaO.Al_2O_3$, amorphous $CaO.Al_2O_3$, amorphous $12CaO.7Al_2O_3$, amorphous $11CaO.7Al_2O_3$, $CaF_2$ and amorphous $3CaO.3Al_2O_3.CaF_2$ and calcium sulfate in a weight ratio of about 1:0.3 to 1:3; about 0.05 to 10% by weight of an inorganic salt selected from the group consisting of $ZnCl_2$, $AlCl_3$, $CaCl_2$, $MgCl_2$, $FeCl_2$, $NiCl_2$, $CoCl_2$, $MgBr_2$, [$ZnI_2$] $Na_2SO_4$, $K_2SO_4$, $NaNO_2$, $NaNO_3$, $KNO_3$, $KNO_2$, $Ca(NO_2)_2$, $Ca(NO_3)_2$, $MgSO_4$, $FeSO_4$, $Al_2(SO_4)_3$, $CaB_4O_7$, $Na_2CO_3$, $K_2CO_3$, $NaHCO_3$, and $KHCO_3$, and about 0.05% to 3% by weight of at least one of an organic carboxylic acid selected from the group consisting of malonic acid, glutaric acid, 1,2,3-propanetricarboxylic acid nitrilotriacetic acid and ethylenediamine tetraacetic acid, an organic hydroxycarboxylic acid selected from the group consisting of malic acid, gluconic acid, citric acid, tartaric acid, salicylic acid, oxymalonic acid and latic acid and a salt thereof, and
   (b) about 30 to 400 parts by weight of an asphalt emulsion containing 50 to 65% by weight asphalt, about 0.2 to 8% by weight of a polyoxyethylene alkyl phenyl ether, polyoxyethylene alkyl ether, polyoxyethylene alkyl ester, sorbitan alkyl ester, polyoxyethylene sorbitan alkyl ester or sucrose fatty acid ester nonionic emulsifier and about 0.05 to 2% by weight a multivalent metal chloride, calculated as the multivalent metal ion.

2. The quick hardening cement-asphalt composition as claimed in claim 1, wherein said calcium aluminate-series mineral is amorphous $12CaO.7Al_2O_3$.

3. The quick hardening cement-asphalt composition as claimed in claim 1, wherein said inorganic salt is $Na_2CO_3$, $K_2CO_3$, $NaHCO_3$ or $KHCO_3$.

4. The quick hardening cement-asphalt composition as claimed in claim 1, wherein said organic carboxylic acid, said organic hydroxycarboxylic acid or the salt thereof is an organic hydroxycarboxylic acid or a salt thereof.

5. The quick hardening cement-asphalt composition as claimed in claim 1, wherein said nonionic emulsifier is a surface active agent represented by the following formula (I)

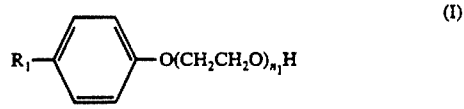

wherein $R_1$ represents a straight chain or branched chain alkyl group having about 6 to 18 carbon atoms and $n_1$ is about 10 to 80; or
the followng formula (II)

wherein $R_2$ represents a straight chain or branched chain alkyl group having about 8 to 22 carbon atoms and $n_2$ is about 8 to 80.

6. The quick hardening cement-asphalt composition as claimed in claim 1, wherein said multivalent metal chloride is $AlCl_3$, $FeCl_2$, $FeCl_3$, $CaCl_2$, $ZnCl_2$, $SnCl_2$, $SnCl_4$, $BaCl_2$ or $MgCl_2$.

7. The quick hardening cement-asphalt composition as claimed in claim 1, wherein said clacium aluminate-series mineral is amorphous $12CaO.7Al_2O_3$, amorphous $11CaO.7Al_2O_3.CaF_2$, or amorphous $3CaO.3Al_2O_3.CaF_2$ and said nonionic emulsifier is a polyoxyethylene nonylphenyl ether.

8. The quick hardening cement-asphalt composition as claimed in claim 1, wherein said calcium sulfate is anhydrous calcium sulfate and said calcium aluminate-series mineral is an amorphous $12CaO. 7Al_2O_3$.

9. The quick hardening cement-asphalt composition as claimed in claim 8, wherein the weight ratio of said $12CaO.7Al_2O_3$ to said anhydrous calcium sulfate is in the range of 1:0.8 to 1:1.2.

10. The quick hardening cement-asphalt composition as claimed in claim 1, wherein said mixture comprises $12CaO.7Al_2O_3$ ad anhydrous calcium sulfate in a weight ratio of 1:0.8 to 1:1.2 is present in a proportion of 20 to 35% by weight based on the weight of said portland cement.

11. The quick hardening cement-asphalt composition as claimed in claim 1, wherein said inorganic salt is $Na_2CO_3$ or $K_2CO_3$ and is present in a proportion of 0.5 to 3% by weight based on the weight of said portland cement.

12. The quick hardening cement-asphalt composition as claimed in claim 1, wherein said organic carboxylic acid, the organic hydroxycarboxylic acid and the salt thereof is at least one of citric acid, tartaric acid and the sodium, potassium and calcium salts thereof and is present in a proportion of 0.1 to 1% by weight based on the weight of said portland cement.

13. The quick hardening cement-asphalt composition as claimed in claim 1, wherein said composition comprises
   (a) 100 parts by weight of a cement composition prepared by adding to portland cement 20 to 35% by weight of a mixture of an amorphous $12CaO.7Al_2O_3$ and anhydrous calcium sulfate in a proportion of 1:0.8 to 1:1.2 by weight, 0.3 to 3% by weight of $Na_2CO_3$ or $K_2CO_3$, and 0.1 to 1% by weight of at least one of citric acid, tartaric acid and the sodium, potassium and calcium salts thereof, and
   (b) 70 to 200 parts by weight of said asphalt emulsion.

14. The quick hardening cement-asphalt composition as claimed in claim 1, wherein said asphalt emulsion contains 50 to 65% by weight of a petroleum asphalt having a penetration of about 40 to 60 to about 200 to 300, 0.5% to 3% by weight of a nonionic emulsifier having the formula

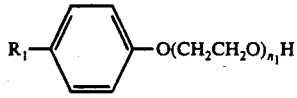

wherein $R_1$ represents a straight chain or branched chain alkyl group having 8 to 12 carbon atoms and $n_1$ is 20 to 40, and $CaCl_2$ as a multivalent metal chloride in an amount of 0.1 to 1% by weight calculated as clacium ion.

15. A quick hardening cement-asphalt composition used as a grout for a ballast-filled track structure having the following properties:
   (1) a compressive strength of about 4 $kg/cm^2$ within about 60 to 90 minutes after execution,
   (2) a consistency of about 5 to 10 seconds with a J funnel (the PC grout test method by the Civil Engineering Society of Japan),
   (3) the consistency of (2) above must be maintained for at least 20 minutes after mixing, and
   (4) the compressive strength of (1) above be maintained at temperatures ranging from about 5° to 35° C, said cement-asphalt compsition consisting essentially of
   (a) 100 parts by weight of a cement composition prepared by adding to portland cement 20 to 35% by weight of a mixture of amorphous $12CaO.7Al_2O_3$ and anhydrous calcium sulfate in a weight ratio of about 1:0.8 to 1:1.2; 0.5 to 3% by weight of $Na_2CO_3$ or $K_2CO_3$, and 0.1 to 1% by weight of at least one of citric acid, tartaric acid and the sodium, potassium and calcium salts thereof, and
   (b) 70 to 200 parts by weight of an asphalt emulsion containing 50 to 65% by weight of a petroleum asphalt, 0.5 to 3% by weight of a nonionic emulsifier having the formula

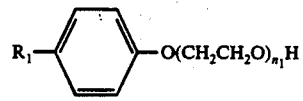

wherein $R_1$ represents a straight chain or branched chain alkyl group having 8 to 12 carbon atoms and $n_1$ is 20 to 40, and 0.1 to 1% by weight of $CaCl_2$ calculated as calcium ion.

* * * * *